Dec. 26, 1961     G. B. GRONVOLD     3,014,602
AUTOMOBILE PARKING AND STORAGE APPARATUS
Filed Dec. 19, 1960     3 Sheets-Sheet 1
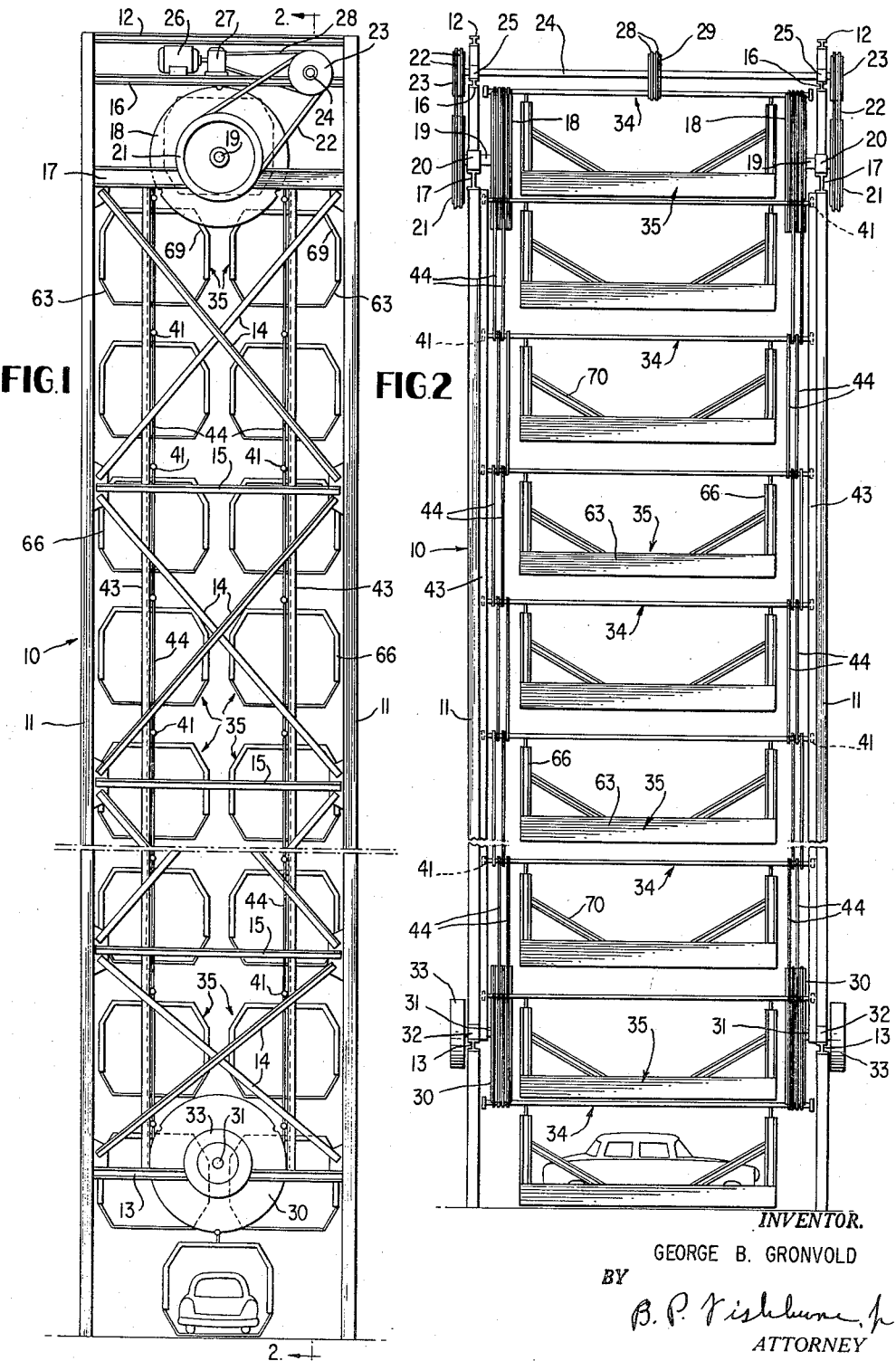
INVENTOR.
GEORGE B. GRONVOLD
BY
ATTORNEY Dec. 26, 1961  G. B. GRONVOLD  3,014,602
AUTOMOBILE PARKING AND STORAGE APPARATUS
Filed Dec. 19, 1960  3 Sheets-Sheet 2
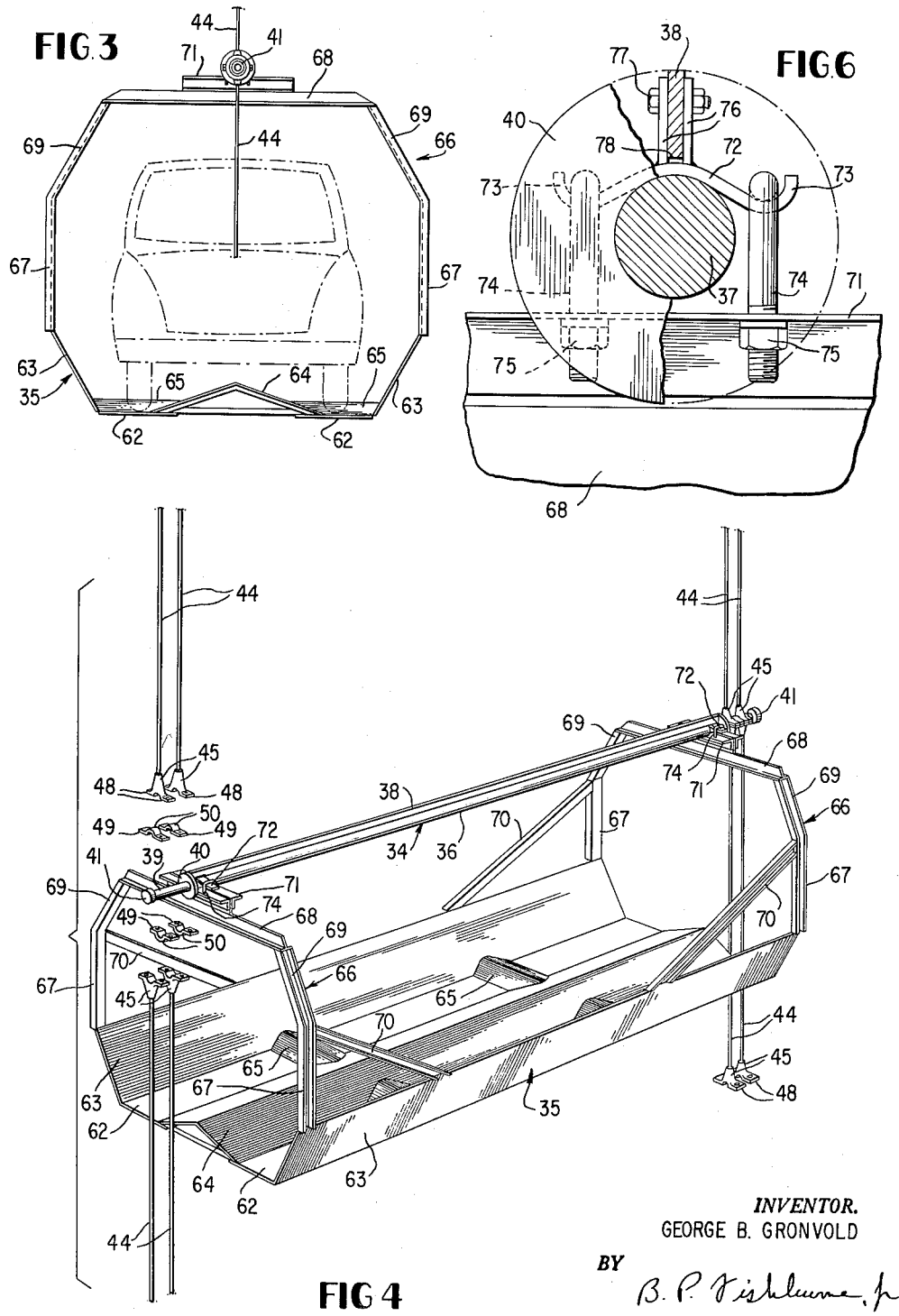
INVENTOR.
GEORGE B. GRONVOLD
BY
B. P. Fishburne, Jr.
ATTORNEY Dec. 26, 1961   G. B. GRONVOLD   3,014,602
AUTOMOBILE PARKING AND STORAGE APPARATUS
Filed Dec. 19, 1960   3 Sheets-Sheet 3
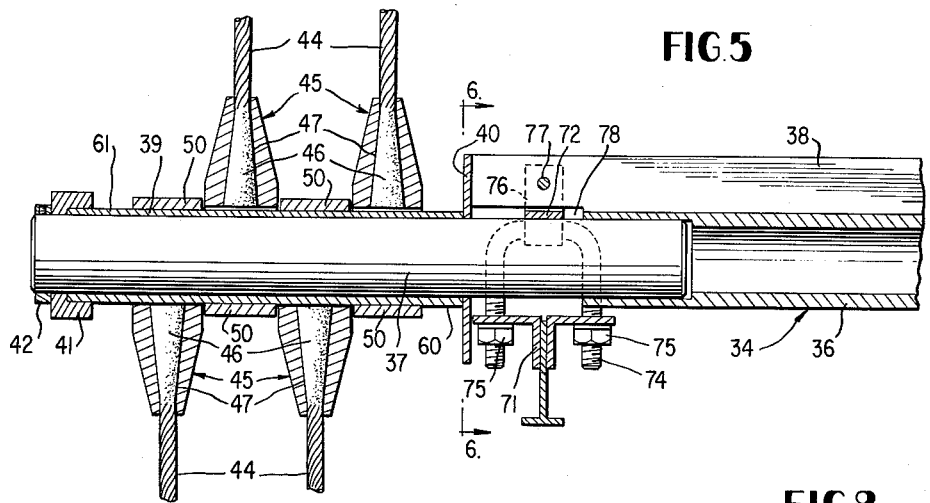
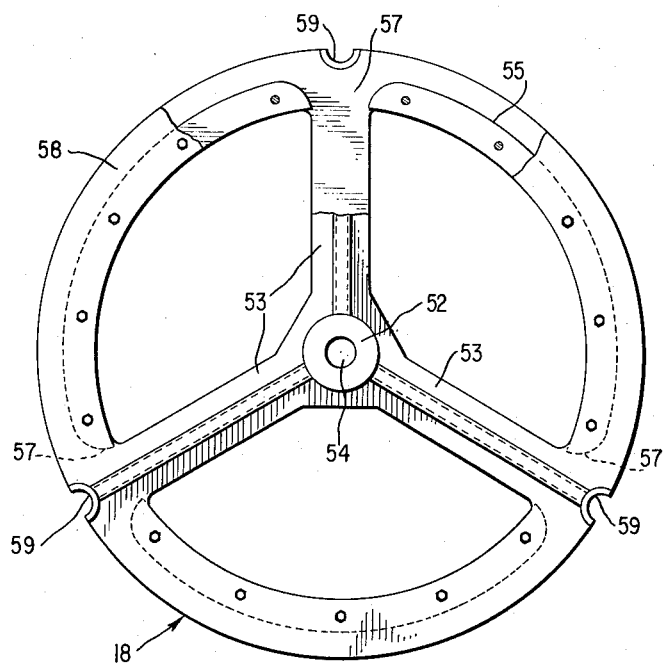
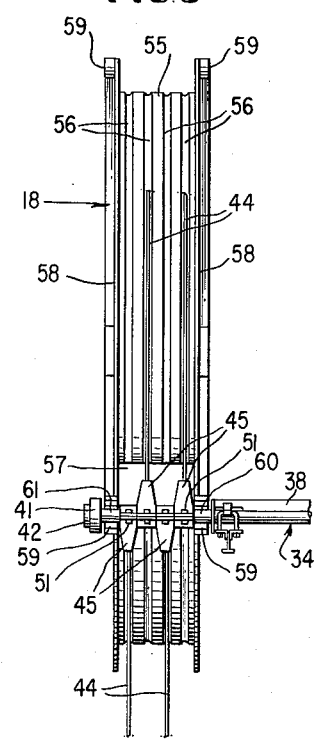
INVENTOR.
GEORGE B. GRONVOLD
BY
ATTORNEY

United States Patent Office 3,014,602
Patented Dec. 26, 1961

3,014,602
AUTOMOBILE PARKING AND STORAGE
APPARATUS
George B. Gronvold, 800 4th St. SW., Washington, D.C.
Filed Dec. 19, 1960, Ser. No. 76,859
9 Claims. (Cl. 214—16.1)

This invention relates to automobile parking and storage apparatus.

A primary object of the invention is to provide power-operated apparatus of the above-mentioned character which will help to alleviate the critical parking problem in urban areas, where space is extremely limited and the price of land is very high.

A further object is therefore to provide apparatus of the mentioned character capable of handling the greatest possible number of automobiles per cubic foot of space available, rapidly and efficiently and with minimum costs for machinery and labor.

A further and more specific object is to provide parking and storage apparatus for automobiles having an improved, simplified and highly economical conveyer mechanism including sectionalized cable components which are adjustable and replaceable, as well as improved storage cradles or racks for the automobiles associated with the conveyer mechanism.

Another object is to provide a conveyer mechanism for the apparatus which eliminates entirely the necessity for expensive roller conveyer chains and toothed sprocket wheels subject to excessive and cumulative wear, frequently necessitating replacement of the entire conveyer mechanism in apparatus of this character with resultant great expense.

Another object of the invention is to provide in apparatus of the mentioned character a novel and highly compact arrangement of driving and idler wheels or sheaves of the smallest possible diameter, and constructed for coaction with the cable means and automobile racks in a manner permitting minimum lateral spacing between the racks on the vertical runs of the cable means and close passage of adjacent racks around the wheels or sheaves without interference.

A further object is to provide apparatus of the above-mentioned character in which each automobile rack and its adjacent components constitutes a separate and distinct unit capable of independent adjustment and being readily removable and replaceable in the apparatus.

Still another object is to provide a parking and storage apparatus for automobiles which is extremely sturdy and durable, relatively lightweight, easy to assemble and disassemble, reliable and efficient in operation and requiring a minimum of maintenance.

Other objects and advantages of the invention will be apparent during the course of the following detailed description.

In the accompanying drawings forming a part of this application and in which like numerals are employed to designate like parts throughout the same:

FIGURE 1 is a side elevation of an automobile parking and storage apparatus embodying the invention, FIGURE 2 is a vertical section taken substantially on line 2—2 of FIGURE 1 and partly broken away, FIGURE 3 is an end elevation of a storage rack or cradle for an automobile according to the invention, FIGURE 4 is a perspective view, partly exploded, of the rack and associated elements constituting a unit of the conveyer mechanism in the apparatus, FIGURE 5 is an enlarged fragmentary longitudinal vertical section through the hanger shaft and associated elements of the rack shown in FIGURE 4, FIGURE 6 is a fragmentary vertical section taken substantially on line 6—6 of FIGURE 5, FIGURE 7 is a side elevation of a wheel or sheave employed in the apparatus partly broken away, FIGURE 8 is an edge elevational view of a wheel or sheave and associated elements, partly broken away.

In the drawings, wherein for the purpose of illustration is shown a preferred embodiment of the invention, FIGURES 1 and 2 illustrate the apparatus in its entirety as assembled for use. With reference to these figures, the numeral 10 designates generally an upright rectangular frame or tower of the desired height and being quite narrow in both horizontal directions as compared to its height. The particular design of the frame 10 is of little consequence in the invention, and the frame comprises upright corner columns 11 at the four corners thereof, the tops of the columns being rigidly interconnected by horizontal cross beams 12. Columns 11 are similarly rigidly interconnected near and above their lower ends by similar horizontal cross beams 13. Between the cross beams 12 and 13, preferably on all sides of the frame 10, the same is preferably further braced by suitable numbers of cross braces 14 and horizontal braces 15 as indicated in FIGURE 1. Some of the bracing which forms no part of the invention is omitted in FIGURE 2 for the sake of clarity. Somewhat below the beams 12, suitable horizontal platform means 16 is mounted rigidly within the frame 10 for the support of drive mechanism, to be described. Similarly, below the platform means 16 and above the uppermost braces 14, heavy horizontal cross beams 17 are provided for the mounting of main sheaves or driving wheels for the conveyer apparatus, to be described. The interior of the frame 10 is open and unobstructed for the free passage of the automobile racks and associated elements, and the frame is open on all sides below the lowermost beam 13 to facilitate loading and unloading of the racks and ready access thereto at ground level. The design of the frame or tower may be varied as found desirable, and it is intended not to limit the invention to any particular frame construction, which construction is largely conventional.

With continued reference to the drawings, a pair of drive wheels or sheaves 18 are mounted for rotation in vertical planes near the top of the frame 10 and on opposite sides thereof, FIGURE 2, just inwardly of the columns 11 and their braces. Each drive wheel 18 is rigidly secured to a short horizontal shaft 19 for rotation therewith, journaled upon a suitable bearing 20, rigidly mounted upon the adjacent beam 17. Outwardly of the bearing 20, each shaft 19 carries a large pulley 21, rigid therewith, receiving belt gearing 22 or the like, operatively connected with a smaller pulley 23, carried by one end of a transverse horizontal drive shaft 24 spanning the top of the frame 10 and journaled for rotation upon bearings 25, rigidly mounted upon platform means 16.

A suitable prime mover 26 such as a reversible electric motor is mounted upon the platform means 16, as shown, with its armature shaft operatively connected with speed reduction gearing 27 of any conventional type, in turn operating belt gearing 28, or the like, connected with a drive pulley 29, secured to the shaft 24 near the longitudinal center thereof. The controls for the motor 26 and associated elements are conventional and form no part of this invention and need not be described herein. Any other type of power-operated drive means may be employed as found desirable in place of the particular drive means shown and described, and it is intended not to limit the invention in this respect. In any event, as should now be clear, the drive wheels 18 are adapted to be turned in unison through the medium of the power-operated drive means and gearing shown in FIGURES 1 and 2.

Near the bottom of the frame 10, a companion pair of driven or idler wheels 30, substantially identical to the wheels 18, are provided, in vertical alignment with the wheels 18 and rigidly mounted upon short shafts 31, journaled for rotation in bearings 32, secured to the cross beams 13 as shown. Conventional electrically operated brake assemblies 33 for the shafts 31 are connected with the outer ends of the latter and controlled by the conventional control means for the drive motor 26, not shown.

The essence of the invention now to be described in conjunction with the wheels or sheaves 18 and 30 comprises a multiplicity of transverse horizontal rack hanger shafts 34 spanning the frame 10 inwardly of the columns 11, FIGURE 2, and each supporting an automobile carrying cradle or rack 35 in a manner to be described. With reference to FIGURES 4 and 5, each shaft 34 embodies a main tubular section 36 constituting the body portion theerof and having solid cylindrical shaft extensions 37 telescopically rigidly mounted within its opposite ends as best shown in FIGURE 5. An upstanding longitudinal reinforcing rib 38 is secured rigidly to the top of each shaft 34 by welding or the like, as shown, to render each shaft rigid and to facilitate using hanger shafts of relatively small diameter. Bronze bushings 39 or the like are mounted upon each solid shaft extension 37 beyond the adjacent end of the rib 38, and a flat washer or spacer 40 is preferably interposed between each bushing 39 and the end of rib 38 as shown in FIGURE 5. A guide roller 41 positioned by an adjustable collar 42 is journaled upon the end of each shaft extension 37 for engagement with straight vertical guide rails 43, secured rigidly to the adjacent sides of the main frame 10 and extending continuously from the horizontal beams 17 to the beams 13 and rigid with these beams. A pair of the straight guide rails 43 is provided at opposite sides of the main frame, FIGURE 2, in parallel spaced relation intermediate the columns 11, FIGURE 1. As shown in FIGURE 1, the guide rollers 41 travel on the inner opposed faces of the rails 43.

Associated with each hanger shaft 34 are interfitting pairs of flexible cable sections 44, FIGURES 4 and 5, one pair extending above each shaft 34 and one pair extending therebelow in staggered relation as shown. The cable sections 44 are all of the same length and long enough to provide the desired equal spacing between the several hanger shafts 34 for the automobile racks and providing the minimum practical spacing between adjacent racks of the conveyer mechanism.

Each identical cable section 44 is provided at opposite ends with a rigid socket element 45, permanently fixedly secured thereto as shown at 46 by unraveling the end portions of the cable strands and filling them with molten metal or the like to provide a firm anchor for the end of the cable section in the tapered bore 47 of the socket element. Each socket element 45 carries a pair of laterally extending apertured flanges 48 integral therewith for connection with mating apertured flanges 49 of arcuate connector caps 50 which engage over the side of the shaft bushing 39 remote from the socket element 45. Each cap 50 is adjustably rigidly secured to the associated socket element 45 by bolt means 51, FIGURE 8.

Thus, one end of each of the four flexible cable sections 44 associated with each end of each hanger shaft 34 is pivotally mounted upon the adjacent bushing 39 for free rotation with respect to the latter, and the several independent cable sections at opposite ends of the several shafts 34 thus serve to interconnect all of the shafts adjustably and constitute with the shafts an endless flexible conveyer structure for coaction with the wheels 18 and 30 as now to be described.

With particular reference to FIGURES 7 and 8, each wheel 18 and 30 comprises a central hub portion 52 and spokes 53, preferably three in number and spaced apart 120 degrees circumferentially. The bore 54 of the hub 52 receives the shaft 19 or 31 therein rigidly for rotation therewith as previously stated. Each wheel further comprises a peripheral portion 55 of considerable axial width having four grooves 56 formed therein, arcuate in cross section to receive the chain of cable sections 44 and guide the same upon the wheels 18 and 30 without tending to mash or flatten the cable sections. The peripheral portion 55 of each wheel is interrupted or recessed at 57 adjacent each spoke 53 to provide clearance for the socket elements 45 and caps 50 as the cable sections pass about the wheels in guided relation.

Each wheel further comprises side flanges 58, as shown, projecting somewhat radially beyond the peripheral base 55 and provided adjacent the recesses 57 and spokes with arcuate sockets 59 receiving the portions 60 and 61 of the bushings 39 between the outermost socket elements 45, rollers 41 and spacers 40. That is to say, as the wheels 18 and 30 turn and the chain of cable sections and hanger shafts pass endlessly around the four wheels, the bushing portions 60 and 61 exposed between the elements 41 and 45 and 40 and 45 successively engage within the arcuate sockets 59 of the wheels and then pass out of these sockets as the wheels continue to turn for driving the endless flexible conveyer structure. The arrangement of the three sockets 59 on each wheel spaced apart 120 degrees thereon is ideal for driving the endless flexible conveyer structure efficiently and without slippage, and the spacing of the sockets 59 constitutes an important feature of the invention in connection with the automobile racks now to be described.

With reference to FIGURES 3–6, each identical rack 35 is freely pivotally suspended from one of the hanger shafts 34 as shown generally in FIGURE 4. Each rack 35 embodies a preferably sheet metal floor or body portion comprising spaced flat horizontal automobile wheel-receiving portions 62 having upstanding inclined outer side buffer portions 63 or flanges which are sloped 60 degrees above the horizontal. Between the flat portions 62, each rack floor has an upwardly projecting longitudinal inverted V-shaped hump 64 extending for the entire length of the rack, the sides of the hump 64 being inclined approximately 30 degrees above the horizontal. The hump 64 and the inclined flanges 63 aid in guiding the wheels of an automobile onto the rack 35 as should be obvious. The wheels of small size foreign automobiles and the like may engage the hump 64 and be guided thereby and the wheels of larger standard size automobiles tend to engage the flanges 63 to be centered thereby. In this connection, the flanges 63 prevent the sides of the automobile from ever coming into contact with the sides of the rack and this is obviously a desirable feature. Additionally, the flanges 63 and hump 64 add a great deal of rigidity to the rack, as should be obvious. Upstanding inverted V-shaped wheel chocks 65 are also preferably formed transversely of the wheel receiving portions 62 in spaced relation, as shown, to engage inwardly of the front and rear wheels of the automobile to prevent the same from rolling accidentally on the rack.

Each rack 35 further comprises upstanding open rigid end frames 66 having vertical portions 67 secured rigidly to the tops of flanges 63 at the ends of the latter. The end frames further comprise top horizontal bars 68 and upper inclined converging portions 69 which are sloped 60 degrees above the horizontal and are of lengths preferably equal to the width of each flange 63. The end frames 66 are thus symmetrical and eight-sided as best shown in FIGURE 3 for clearance purposes as will be further described. Each rack 35 may be further strengthened as by diagonal braces 70 at the sides and ends of the same.

Each rack 35 is pivotally suspended from the adjacent shaft 34, as stated, by a pair of transverse preferably T-shaped hanger brackets 71, rigidly secured to the bars 68 in any suitable manner, as by welding. Sturdy hanger straps 72 engage over the tops of the solid shaft extensions 37 transversely, FIGURE 6, and have their upturned ends 73 engaged detachably with inverted U-bolts 74, rigidly connected as at 75 with the T-shaped hanger brackets 71. The tops of the straps 72 carry upstanding apertured lugs 76, secured rigidly at 77 to the longitudinal rib 38, as shown. A passage 78 is provided through the rib for the hanger strap 72 as shown in FIGURES 5 and 6. By this means shown and described in connection with FIGURES 5 and 6, each rack 35 is hung detachably and adjustably from its associated shaft 34.

It may now be seen that each rack 35, its shaft 34 and its associated cable sections 44 constitutes a separate and distinct unit in the endless conveyer structure which may be removed and replaced if necessary, without dismantling and/or replacing the entire endless conveyer structure. Additionally, the endless conveyer structure in the present apparatus has been designed to be substantially free of wear, as contrasted with the conventional sprocket wheel and roller or link type conveyer chains which are subject to great wear and wear which accumulates and cannot be compensated for except by eventual replacement of the entire chain and sprocket wheel drive. The present endless flexible conveyer structure requires practically no maintenance and, as stated, the system is adjustable and the individual units may be replaced if this should ever become necessary.

The operation of the apparatus for loading, unloading and storing automobiles is quite conventional and should be obvious to those skilled in the art. The conveyer mechanism may be operated by conventional controls in either direction for raising or lowering either vertical run carrying a vertical group of the automobile racks. The conveyer mechanism may be stopped at any desired point and loading and unloading of the racks takes place at the bottom of the frame 10 or ground level as shown in FIGURE 1. The construction provides for the handling and storage of the maximum possible number of automobiles in the minimum ground area and the minimum cubic space. By virtue of the 120 degree spacing of the sockets 59 and the 60 degree angular disposition of the rack portions 63 and 69, the wheels 18 and 30 may be constructed with a minimum diameter and the vertical runs of racks 35 need be separated a very slight distance only as shown in FIGURE 1, and this is in contrast to the prior art utilizing link chains and sprocket wheels for the conveyer mechanism. As best shown in FIGURE 1, the 60 degree inclined rack portions 63 and 69 permit close passage of the chain of racks around the peripheries of the wheels 18 and 30 without interference, in coaction with the 120 degree circumferential spacing of the shaft carrier sockets 59 on the wheels. The arrangement is highly compact and provides for a great saving of space which is highly important for obvious economic reasons.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. Automobile parking and storage apparatus comprising an upstanding frame, pairs of wheels journaled upon said frame in axially spaced relation near the top and bottom thereof, power means to drive a pair of said wheels in either direction in unison, each of said wheels having a groove peripheral face, each of said wheels including side flanges extending radially beyond said peripheral face and having circumferentially spaced sockets, a multiplicity of automobile carrying racks for movement within said frame, a horizontal hanger shaft for each rack spanning the top of the rack lengthwise and transversely of said frame in one direction, adjustable screw-threaded suspension bracket means interconnecting each rack and one of said hanger shafts and allowing each rack to be adjusted somewhat vertically relative to its hanger shaft, end portions of said hanger shafts engageable within said sockets during rotation of said wheels, and a multiplicity of flexible cable sections extending between said hanger shafts and including end rigid connector elements adapted to pivotally engage said end portions of said shafts, screw-threaded means adjustably interconnecting each opposed pair of said end rigid connector elements and allowing some adjustment of the spacing between the hanger shafts, said cable sections engageable with the grooves of said peripheral faces of said wheels.

2. An automobile storage rack for use in an endless conveyer-type parking and storage apparatus comprising a sheet metal floor body portion including spaced parallel horizontal longitudinal tracks for the wheels of standard size automobiles, longitudinal steep upwardly inclined side plates of substantial height carried by the outer edges of said tracks and inclined substantially sixty degrees from the horizontal, said side plates centering the wheels of standard size automobiles and preventing damage to the sides of automobiles caused by contact with the sides of the rack, an intermediate longitudinal inverted V-shaped hump in said floor body portion between said tracks and being of substantial width and having sides inclined substantially thirty degrees from the horizontal and centered on the floor body portion, said hump engaging the wheels of undersize automobiles and centering the same within the rack, said hump and side plates also materially increasing the stiffness of the floor body portion, upstanding end frames for said rack having their lower ends secured to said inclined side plates, suspension bracket means including screw-threaded adjusting parts carried by the tops of said end frames, and a horizontal hanger shaft carrying said rack and pivotally engaging said bracket means and spanning said rack longitudinally and having end portions for connection with flexible conveyer elements.

3. Automobile parking and storage apparatus comprising an upstanding rigid frame having corner posts and being open inwardly of the corner posts, upper and lower pairs of wheels journaled upon said frame near the top and bottom thereof and near and inwardly of opposite sides of said frame, power means to drive one pair of said wheels in unison, each of said wheels having recess means in the periphery thereof at three equidistantly spaced points about the circumference of said wheel, a multiplicity of pairs of independent cable sections of equal lengths for engagement with said wheels during rotation of the latter, two part rigid bearing connector means for the ends of said cable sections of each adjacent pair, adjustable screw-threaded bolt means interconnecting said two part connector means, whereby said cable sections together form endless flexible conveyer elements, horizontal hanger shafts journaled within said bearing connector means of the cable sections and carried bodily by such means and being spaced apart equidistantly upon said endless flexible conveyer elements, and a corresponding number of automobile supporting racks suspended from said hanger shafts within said frame, end portions of said hanger shafts and said bearing connector means of the cable sections engageable within said peripheral recess means of said wheels during rotation of the latter.

4. In an automobile parking and storage apparatus, an endless flexible conveyer mechanism including a multiplicity of independent replaceable units, each unit comprising a horizontal hanger shaft, pairs of flexible cable sections of equal length extending above and below end portions of said hanger shaft, rigid connector elements carried by the ends of said cable sections and adapted to rotatably receive said end portions of the hanger shaft, adjusting screw means interconnecting each adjacent pair of said rigid connector elements, guide roller means on the ends of said hanger shaft outwardly of said cable sections adapted to engage guide rail means of said apparatus, and an automobile carrying rack pivotally suspended from said hanger shaft inwardly of and between said cable sections and detachably secured to the hanger shaft.

5. An automobile parking and storage apparatus comprising an upright centrally open rigid rectangular frame, power means mounted upon the upper portion of said frame, a pair of drive wheels journaled upon opposite sides of said frame near the top thereof and driven by said power means in unison, a companion pair of driven wheels journaled upon opposite sides of said frame near the lower end thereof in vertical alignment with said drive wheels, a multiplicity of horizontal hanger shafts spanning said frame transversely in one direction and parallel to the axes of said wheels, vertical guide rails mounted upon said frame and having guiding engagement with the ends of said hanger shafts when the latter are traveling vertically between said pairs of wheels, an automobile storage rack pivotally suspended from each hanger shaft and disposed within said frame and adapted to receive an automobile longitudinally of the hanger shaft, a multiplicity of separable identical flexible cable sections extending between and flexibly interconnecting said hanger shafts engageable about said pairs of wheels during rotation of the latter, and means detachably interconnecting adjacent ends of said cable sections at each hanger shaft, said means consisting of opposed pairs of two part connector elements rotatably receiving an end portion of the adjacent hanger shaft and supporting the same, and screw-threaded bolt means adjustably connecting each pair of connector elements, each of said wheels being notched at circumferentially spaced points for positive driving engagement with said end portions of said hanger shafts.

6. A readily replaceable unit for an automobile parking and storage apparatus, said apparatus having vertical guide rail means, said unit comprising a tubular hanger shaft body portion, solid end shaft extensions telescopically mounted within the opposite ends of said tubular body portion and rigid therewith, guide rollers journaled upon the outer ends of said shaft extensions for rolling engagement with said guide rail means, interfitting sleeve connectors rotatably receiving said end shaft extensions and arranged in alternating pairs having socket portions extending above and below said shaft extensions, pairs of flexible cable sections having corresponding ends firmly anchored within said socket portions and extending above and below said shaft extensions and adapted for connection with other replaceable conveyer units in said apparatus, and an automobile storage rack dependingly pivotally secured to said hanger shaft body portion between said shaft extensions and cable sections and being open-ended lengthwise of said shaft body portion.

7. Automobile parking and storage apparatus comprising upstanding supporting means, power-operated drive wheel means mounted upon the supporting means near the top and bottom thereof, a plurality of automobile storage racks to move within the supporting means in spaced relation, a corresponding number of horizontal hanger shafts for said racks having end portions projecting beyond opposite ends of the racks, adjustable screw-threaded suspension bracket means interconnecting each rack and one of said rack hanger shafts and allowing each rack to be adjusted somewhat vertically relative to its hanger shaft, a plurality of pairs of flexible cable sections for connection with said shaft end portions and forming in assembly a pair of endless flexible conveyer elements within said supporting means near opposite ends of said racks and engaging said drive wheel means and driven thereby, and end adjustable screw-threaded connector means carried by said cable sections and secured to said shaft end portions to thereby flexibly interconnect the cable sections and hanger shafts and allowing some adjustment of the spacing between the several horizontal hanger shafts connected in said endless conveyer elements.

8. Automobile parking and storage apparatus comprising a supporting frame structure, upper and lower pairs of wheels journaled upon the supporting frame structure for rotation, power means to drive at least a pair of said wheels, said wheels provided in their peripheries with sockets spaced 120 degrees apart circumferentially, a multiplicity of automobile carrying racks, each rack having upper and lower corner portions inclined 60 degrees from the horizontal to facilitate the passage of the racks about wheels of minimum diameter without interference, hanger shafts carrying the racks and having end portions engageable within the sockets of the wheels during passage of the racks thereabout for positively driving the racks, sectional cables engaging said wheels endlessly and forming endless conveyer elements for the racks, and separable individually adjustable coupling parts carried by the ends of the sections of the cables and embracing the hanger shaft end portions and carrying the same and allowing some adjustment of the spacing between each pair of racks.

9. The invention as defined by claim 8, and pairs of guide rails on said supporting frame structure engageable with said hanger shaft end portions during passage of the same with the racks between said upper and lower pairs of wheels.

References Cited in the file of this patent
UNITED STATES PATENTS

| | | |
|---|---|---|
| 581,803 | Armstrong | May 4, 1897 |
| 2,089,047 | Zrna | Aug. 3, 1937 |
| 2,446,344 | Smith | Aug. 3, 1948 |
| 2,619,240 | Teason | Nov. 25, 1952 |
| 2,728,467 | Glicker | Dec. 27, 1955 |
| 2,787,387 | Scott | Apr. 2, 1957 |
| 2,955,718 | Messick | Oct. 11, 1960 |